March 10, 1942.  D. E. RENSHAW  2,275,557
AUTOMATIC DYNAMIC BRAKING CONTROL
Filed Oct. 26, 1940

WITNESSES:

INVENTOR
David E. Renshaw.
BY
Paul E. Frickmann
ATTORNEY

Patented Mar. 10, 1942

2,275,557

UNITED STATES PATENT OFFICE 2,275,557

AUTOMATIC DYNAMIC BRAKING CONTROL

David E. Renshaw, Wilkinsburg, Pa., assignor to Westinghouse Electric & Manufacturing Company, East Pittsburgh, Pa., a corporation of Pennsylvania Application October 26, 1940, Serial No. 362,931

7 Claims. (Cl. 172—179)

My invention relates to motor control systems and more particularly to systems of control for automatically effecting dynamic braking.

Dynamic braking of motors, as such, is old, and no doubt various dynamic braking schemes have been used heretofore, but such schemes were complicated, often requiring many switches, were expensive, and often not reliable either by reason of their complexity or for other reasons.

One object of my invention is the provision of automatic, or self-regulating, dynamic braking of a motor without the use of switches.

It is also an object of my invention to provide in a motor control system that the change from motoring to dynamic braking is accomplished without the operation of supplementary contactors or switches, that is, the change from motoring to braking or vice versa is accomplished with fixed electrical connections and is a function of the motor speed which is, in turn, a function of the load on the motor.

Another object of my invention is to automatically make the dynamic braking effect in a motor change, that is, rise, with greater and greater need for such braking.

It is also an object of my invention to provide in a motor control system such circuit arrangement that the motor supplies the torque required by the load conditions, whether the torque is motoring or braking.

A still further object of my invention is the provision of a simple, efficient, reliable, automatic, and inexpensive dynamic braking control for an electric motor.

The foregoing stated objects are merely illustrative of the objects and advantages of my invention, and other objects and advantages will readily become more apparent from a study of the following specification, particularly when done in conjunction with the drawing accompanying the specification.

My invention finds its greatest use with motors driving loads that vary from a full motor driven load to a given maximum reverse load, that is, a full overhauling motor load. Many motors driving conveyors are subject to this kind of load variation.

Figure 1:
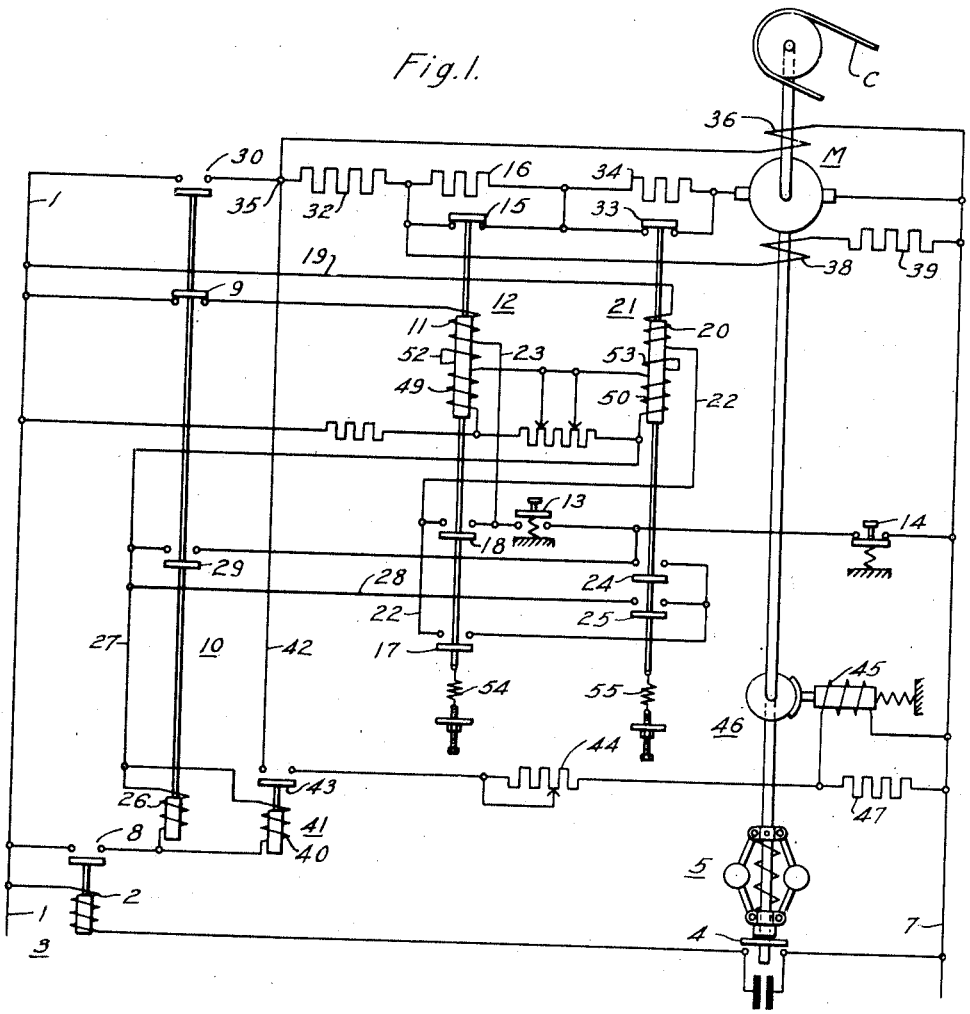
Figure 1 is a diagrammatic showing of my invention as applied to a direct-current motor operating a conveyor.

In this particular case, the conveyor, as C in Fig. 1, is normally used to convey material down a slope. When the conveyor is entirely empty, as well as when only a small amount of material is on the conveyor, the friction load may represent near full load for the motor. The motor must thus supply sufficient power to the conveyor to overcome this friction. The conveyor is thus positively driven by the motor. As the conveyor is loaded with more and more material, the material will furnish sufficient driving force to overcome the friction and other losses and eventually will supply a driving force which must be held by means of an equal braking force.

With the scheme of connections I show in Fig. 1, the motor M is always started from rest in a normal manner by means of a definite starting control. This starting sequence, assuming buses 1 and 7 are energized, is as follows:

A circuit is established from bus 1 through coil 2 of stopping control relay 3, normally closed centrifugal switch 4, controlled by the centrifugal device 5, to the bus 7. Relay 3 operates to close contact members 8; however, no further circuits are established until the starting push-button 13 is operated.

Operation of the starting push-button 13 establishes a circuit from bus 1 through back contact members 9 of the line contactor 10, the main or magnetizing coil 11 of the time limit accelerating contactor 12, conductor 23, starting push-button 13, and stop push-button 14 to bus 7. Operation of contactor 12 effects the opening of contact members 15 shunting the starting resistor section 16, and also effects the closing of contact members 17 and 18. The closure of contact members 18 establishes a circuit from the bus 1 through conductor 19, the main or magnetizing coil 20 of time limit accelerating contactor 21, conductor 22, contact member 18, starting push-button 13, stop push-button 14 to bus 7.

The operation of contactor 21 effects the opening of contact members 33 shunting the starting resistor section 34, and also effects the closing of contact members 24 and 25. The closure of contact members 24 establishes a shunt circuit for push-button 13, so that coils 11 and 20 remain energized even though the push-button 13 is released. This shunt circuit may be traced from energized conductor 23 through contact members 18, conductor 22, contact members 17 and 24 to the stop push-button 14.

Since contact members 24 and 25 and contact members 8 are closed, a circuit is established from bus 1 through contact members 8, coil 26 of the line contactor 10, conductors 27 and 28, contact members 25 and 24, and stop push-button 14 to bus 7. Since coil 40 of the brake control contactor 41 is in parallel to coil 26, this contactor 41 operates substantially simultaneously with contactor 10. Contactor 10 closes a holding circuit for both coils 26 and 40 at contact members 29, thus making the energized position of contactor 10 independent of the starting push-button and also the accelerating contactors.

Closure of contact members 30 establishes a circuit from bus 1 through resistors 32, 16 and 34, the armature of motor M to bus 7. A circuit is also established through the shunt field 36 and through the series field 38 and dynamic braking resistor 39. Field 38 is of the series type, and during overhauling is actually in series with the armature of machine M and may, therefore, be designated generally as a series field.

Another circuit is established from junction 35 through conductor 42, contact members 43, adjustable resistor 44, and brake coil 45 to bus 7. The brake coil 45 of the brake 46 has a discharge resistor 47 for dissipating its energy upon opening of the brake coil circuit.

The motor, assuming the conveyor is empty or only lightly loaded, will now run as an ordinary shunt motor with all the resistors 32, 16 and 34 in the armature circuit.

Since the contact members 9 are open at this stage, main coil 11 is deenergized, and after a definite time interval, depending on the effect of the short-circuit coil 52, the adjustable effect of the neutralizing coil 49 and the adjustment of the spring means 54, contact members 15 close shunt resistor 16.

Since contact members 18 are opened when the armature of contactor 12 is released, the circuit for coil 20 is opened at contact members 17 and 18. In a definite time interval, depending on short-circuit coil 53, the adjustable effect of neutralizing coil 50 and the adjustment of spring means 55, contact members 33 close to shunt resistor 34. The motor thus operates at full speed to positively drive the conveyor C.

During the accelerating period, it will be noted that while the armature current is high, that is, the resistance through the armature circuit is low, the current through the series field 38 is low. As the motor speeds up, that is, as the armature current decreases, the current through field 38 increases. The magnetomotive forces of both fields 36 and 38 are in the same direction. Since the field 36 is excited, a constant amount, the effect of field 38 is to increase its excitation with a rise in speed. This automatically counteracts a too rapid rise in speed. This advantage is, however, not near as important during starting as during normal operation.

During normal operation and with a constant field strength on field 36, the field winding 38 will have a variable current which decreases as the armature current increases and increases as the armature current decreases. The effect of the varying current in the series field winding 38 will thus be to maintain the motor speed more nearly constant than it would be with a fixed field strength. There is thus automatic speed regulation.

Figure 3:
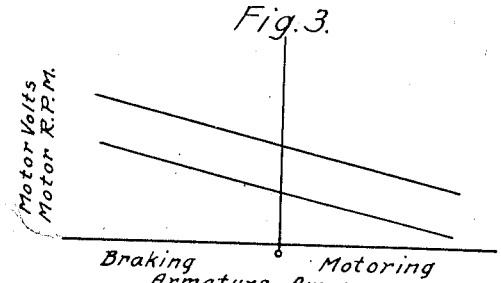
Fig. 3 shows a pair of curves illustrating the speed variations and the variations in counter-electromotive force with changes in motor armature current.

By the circuit arrangement I provide, and a proper selection of the resistance values of resistors 32 and 39 and the characteristics of the field 38, the speed variation of the motor M may be kept relatively small even though the armature current of motor M varies from full load value when driving a load to a full load value, of generated current, while being driven by an overhauling load. Note the curves shown in Fig. 3.

These advantages are accomplished in this manner. As the conveyor C becomes more and more heavily loaded with material, the conveyor will drive the motor at an increasing speed until a speed is reached at which the generated voltage of the armature plus the voltage drop through resistor 32 is equal to the voltage of busses 1 and 7. At this generated voltage of the dynamo-electric machine M, the driving force of the material on the conveyor is just sufficient to overcome the losses, particularly the friction in the conveyor system, and no power is required from the armature of machine M. That is, neither braking nor motoring power is needed.

Figure 2:
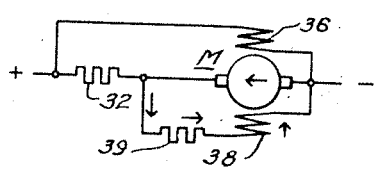
Fig. 2 shows schematically the fundamental essentials of my invention without the correlated complete control system.

If the load on the conveyor is still further increased, the conveyor will drive the motor M, now a generator, at a still higher speed resulting in a still higher generated voltage. The current will then flow from the armature, as indicated by the arrows in Fig. 2, through the field 38 and the dynamic braking resistor 39 to thus produce a braking force.

As the load on the conveyor is increased still more, the speed of machine M, now still a generator, will increase further until the generated voltage of the armature is greater than the voltage of busses 1 and 7 until a voltage is obtained at which no current flows from the busses 1 and 7 through resistor 32 and the field 38 and the dynamic braking resistor 39; at still further increases in conveyor loads, the machine M will return power to the line.

By my system of connections, the machine M is made to change automatically from a motor to a generator in response to the demands of the system without any changes in electrical connections and without the use of any supplementary contactors or relays. The system is entirely stable, since, by proper coordination of the values of resistances for resistors 32, 39 with the characteristics of the field 38 and the characteristics of motor M, a change from full load motoring to full load braking can be accomplished economically and reliably with a change in speed of approximately fifteen percent.

If the conveyor becomes too heavily loaded so that the braking currents through field 38 and resistor 39 become excessive to endanger these elements or to endanger the armature of motor M, then the speed will rise high enough to operate switch 4 by the centrifugal device 5. Operation of switch 4 causes deenergization of overspeed control relay 3. This relay 3 thus opens the circuit at contact members 8 for all the control circuits with the result that the brake 46 sets and the motor is disconnected from buses 1 and 7.

I am, of course, aware that others, particularly after having had the benefit of the teachings of my invention may readily devise other similar circuits for accomplishing the same and similar results. I, therefore, do not wish to be limited to the specific showing made, but wish to be limited only by the scope of the claims hereto appended.

I claim as my invention:

1. In a system of control for a dynamo-electric machine coupled to a load that may vary from a full load driven to a full load overhauling, in combination, means for exciting the machine at a constant value, means for increasing the motor excitation as a function of the decrease in armature current during motor operation, and means for simultaneously and automatically providing a dynamic braking effect and an increase in excitation with an increase in generated armature current during overhauling operation of the machine.

2. In a system of control for a dynamo-electric machine of the direct-current type, in combination, a source of direct current, a dynamo-electric machine, a resistor, said armature and resistor being connected to said source of direct current, a dynamic braking resistor and series field winding connected in parallel to the armature, a main field winding connected to the source of direct current, said field winding acting cumulatively, so that the current in the series field winding increases during decreases of armature current during motor operation and increases during increases of armature current during generator operation.

3. In a system of control for a direct-current motor, in combination, a source of direct current, a resistor, a motor having an armature winding, said resistor and armature being connected in series and connected to said source of direct current, a dynamic braking resistor and series type field winding connected in series both connected in parallel with the armature winding of the motor, and a main field for the motor connected to be energized at a constant value, said field winding acting cumulatively, whereby the excitation effect of the series type field winding always rises when the change of load is negative.

4. In a system of control for a direct-current motor, in combination, a source of direct current, a resistor, a motor having an armature winding, said resistor and armature being connected in series and connected to said source of direct current, a dynamic braking resistor and series type field winding connected in series both connected in parallel with the armature winding of the motor, a main field for the motor connected to be energized at a constant value, said field windings acting cumulatively, whereby the excitation effect of the series type field winding always rises when the change of load is negative, and means for producing a dynamic braking effect when the load becomes overhauling.

5. In a system of control for a direct-current motor, in combination, a source of direct current, a resistor, a motor having an armature winding, said resistor and armature being connected in series and connected to said source of direct current, a dynamic braking resistor and series type field winding connected in series both connected in parallel with the armature winding of the motor, a main field for the motor connected to be energized at a constant value, said field windings acting cumulatively, whereby the excitation effect of the series type field winding always rises when the change of load is negative, means for disconnecting the motor from the source of direct current when the current in the series type field winding is in excess of a given value, and means for braking the load to a stop upon operation of said last named means.

6. In a system of control for a direct current motor, in combination, a source of direct current, a resistor, a motor having an armature winding, said resistor and armature being connected in series and connected to said source of direct current, a dynamic braking resistor and series type field winding connected in series, both connected in parallel with the armature winding of the motor, a main field for the motor connected to be energized at a constant value, said field windings acting cumulatively, whereby the excitation effect of the series type field winding always rises when the change of load is negative, means for producing a dynamic braking effect when the load becomes overhauling, and means for disconnecting the motor from the source of direct current when the current in the series type field winding is in excess of a given value, and means for braking the load to a stop upon operation of said last named means.

7. In a system of control for a direct-current motor, in combination, a source of supply, a direct-current motor having an armature winding and series connected resistor and a field winding connected in parallel to the source of supply, and a dynamic braking resistor and a series field connected in series with each other both connected directly in parallel with the armature winding.

DAVID E. RENSHAW.